US 6,691,048 B2

(12) United States Patent
Yano (10) Patent No.: US 6,691,048 B2
(45) Date of Patent: Feb. 10, 2004

(54) POWER-SOURCE SYSTEM, POWER SUPPLYING METHOD AND IMAGE CAPTURING APPARATUS (75) Inventor: Takashi Yano, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 56 days.

(21) Appl. No.: 09/899,098

(22) Filed: Jul. 6, 2001

(65) Prior Publication Data
US 2002/0024785 A1 Feb. 28, 2002

(30) Foreign Application Priority Data

Jul. 7, 2000 (JP) ........................................ 2000-206063

(51) Int. Cl.$^7$ ............................. G01R 21/00; H02J 7/00
(52) U.S. Cl. ........................ 702/60; 702/63; 320/127; 320/136
(58) Field of Search ............................... 702/58, 59, 60, 702/63, 64, 65; 320/124, 125, 127, 134–136, 162–164; 396/227, 303

(56) References Cited

U.S. PATENT DOCUMENTS

| 3,568,175 | A | * | 3/1971 | Schwehr et al. ............ 320/136 |
| 4,269,489 | A | * | 5/1981 | Takimoto .................... 352/170 |
| 5,963,255 | A | * | 10/1999 | Anderson et al. ........... 348/372 |
| 6,437,699 | B1 | * | 8/2002 | Hayakawa ................... 340/636 |

* cited by examiner

Primary Examiner—John Barlow
Assistant Examiner—Meagan S. Walling
(74) Attorney, Agent, or Firm—Birch, Stewart, Kolasch & Birch, LLP (57) ABSTRACT

A power-source system includes: a power source; a voltage monitoring unit for monitoring a voltage of the power source to detect that the voltage falls below a consumption-limit level below which the use of the power source is to be limited; a consumption limiting unit for limiting the use of the power source when the voltage falls below the consumption-limit level; and a consumption-limit prohibiting unit for prohibiting the consumption limiting unit from limiting the use of the power source when the voltage of the power source falls below the consumption-limit level because of a momentary voltage fall different from a voltage fall corresponding to a discharge curve of the power source.

18 Claims, 7 Drawing Sheets

POWER-SOURCE SYSTEM, POWER SUPPLYING METHOD AND IMAGE CAPTURING APPARATUS

This patent application claims priority based on a Japanese patent application No. 2000-206063 filed on Jul. 7, 2000, the contents of which are incorporated herein by reference.

BACKGROUND OF THE INVENTION

1. Field of the Invention

The present invention relates to a power-source system, a power supplying method and an image capturing apparatus. More particularly, the present invention relates to a power-source system that allows a power source to supply an electric power to a load, a power supplying method that can be used in the power-source system, and an image capturing apparatus that can use the power-source system.

2. Description of the Related Art

A power-source system that outputs a predetermined voltage to a device, obtained by raising or reducing a voltage supplied from a power source. The predetermined voltage is supplied as electric power to the device such as a camera.

Figure 1A:
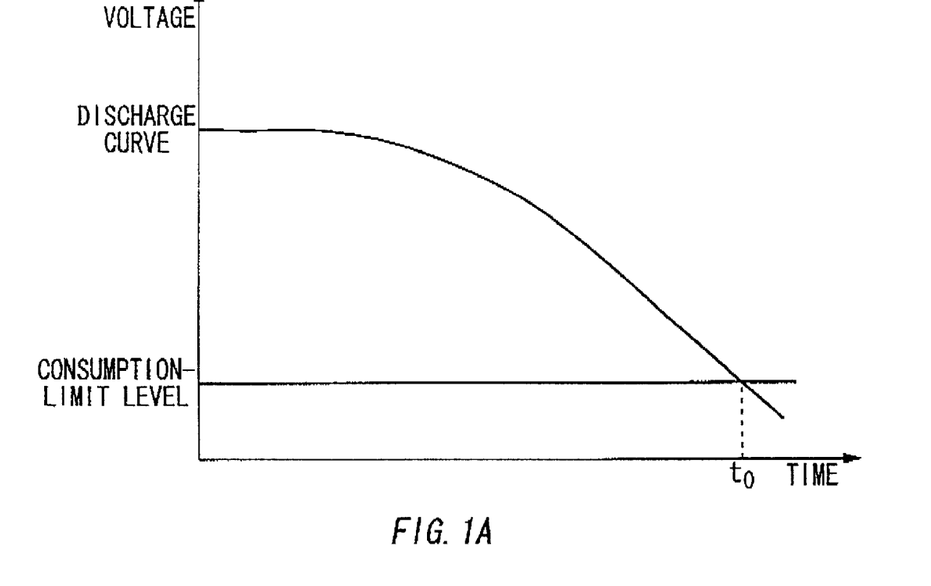
FIGS. 1A and 1B show temporal changes of a battery voltage in a conventional power-source system.
Figure 1B:
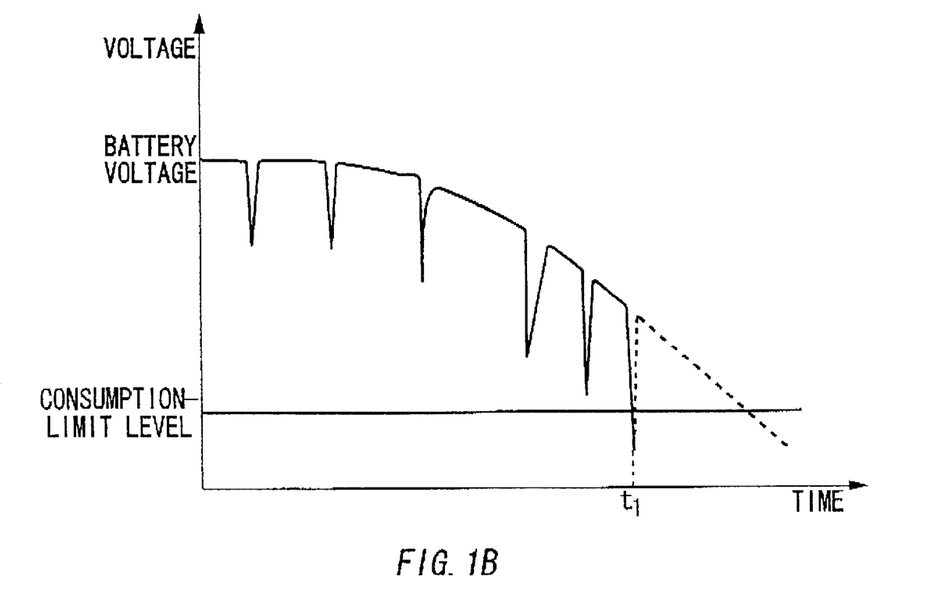

FIGS. 1A and 1B show temporal changes of a battery voltage in a conventional power-source system. FIG. 1A shows a discharge curve of a battery. Generally, the voltage of the battery gradually falls because of the discharge. In a case where the voltage of the battery falls in accordance with the discharge curve as shown in FIG. 1A, the voltage falls below a level of a consumption limit at time t0. The consumption-limit level is set such that a decision that sufficient power cannot be supplied to the device should be made. Thus, at the time t0, it is determined that the battery cannot be used, thereby stopping the use of the battery.

FIG. 1B shows the voltage of the battery used in an actual power-source system. With the consumption of electric energy of the battery, the voltage of the battery gradually falls in accordance with the discharge curve of the battery. In a case where the device performs an operation that momentarily requires a large current, however, the voltage of the battery falls suddenly. Such a phenomenon occurs, for example, when a motor is driven in a camera.

In the above case, since the battery voltage falls below the consumption-limit level at time t1 because of the operation requiring the large current, as shown in FIG. 1B, it is determined at the time t1 that the energy of the battery has been consumed to reach such a level that the battery can no longer be used and therefore the use of the battery should be stopped at the time t1. However, the sudden fall of the voltage at the time t1 is caused by the operation by the device that momentarily requires the large current and therefore the voltage of the battery actually is still at a level at which the battery can be used. In other words, although the battery can still be used, the use of the battery is stopped. Therefore, the electric energy of the battery cannot be used efficiently. Moreover, the use of the battery is stopped at the time t1 although the battery can actually be used until the time t0. Therefore, a time period in which the device can use the battery is shortened.

SUMMARY OF THE INVENTION

Therefore, it is an object of the present invention to provide a power-source system, a power supplying method and an image capturing apparatus that overcome the above issues in the related art. This object is achieved by combinations described in the independent claims. The dependent claims define further advantageous and exemplary combinations of the present invention.

According to the first aspect of the present invention, a power-source system includes: a power source; a voltage monitoring unit operable to monitor a voltage of the power source to detect that the voltage falls below a consumption-limit level below which the use of the power source is to be limited; a consumption limiting unit operable to limit the use of the power source when the voltage falls below the consumption-limit level; and a limit prohibiting unit operable to prohibit the consumption limiting unit from limiting the use of the power source when the voltage of the power source falls below the consumption-limit level because of a momentary voltage fall different from a voltage fall corresponding to a discharge curve of the power source.

The limit prohibiting unit may include a nullifying unit operable to prevent a result of the detection by the voltage monitoring unit from being sent to the consumption limiting unit prior to the momentary voltage fall. Alternatively, the limit prohibiting unit may include a disabling unit operable to disable the voltage monitoring unit prior to the momentary voltage fall. Alternatively, the limit prohibiting unit may include a nullifying unit operable to prevent a result of the detection by the voltage monitoring unit from being sent to the consumption limiting unit when the momentary voltage fall is detected.

According to the second aspect of the present invention, a power supplying method for supplying power to a load from a power source, includes: limiting supply of the power when a voltage of the power source falls below a predetermined level; and prohibiting the supply of the power from being limited in a case where the load requires a larger current than a current required normally, even if the voltage of the power source momentarily falls below the predetermined level.

According to the third aspect of the present invention, an image capturing apparatus for capturing an image, includes at least one component performing a predetermined operation and a power-source system for supplying a power to the one component, wherein the power-source system includes: a power source; a voltage monitoring unit operable to output an abnormal signal when the voltage falls below a consumption-limit level below which the use of the power source is to be limited; a consumption limiting unit operable to limit the use of the power source when receiving the abnormal signal from the voltage monitoring unit; and a limit prohibiting unit operable to prohibit the abnormal signal from being received by the consumption limiting unit in a case where the voltage of the power source falls below the consumption-limit level because of a momentary voltage fall caused by an occurrence of a heavy-load state requiring a larger current than a current required in a normal-load state.

The heavy-load state causing the momentary voltage fall may be a state caused by an operation for driving the at least one component by using a motor.

The image capturing apparatus may further include a limit-prohibition requesting unit operable to send the limit prohibiting unit a request of prohibiting the abnormal signal prior to the occurrence of the heavy-load state.

The limit prohibiting unit may allow the abnormal signal to be sent to the consumption limiting unit in the absence of the request of prohibiting the abnormal signal.

The image capturing apparatus may further include a prohibition-time setting unit operable to set a prohibition time in accordance with a type of the heavy-load state, the prohibition time being a time period during which limiting the use of the battery is to be prohibited.

According to the fourth aspect of the present invention, a power-source system includes: a power source; a voltage monitoring unit operable to detect that a voltage of the power source falls below a consumption-limit level below which the use of the power source is to be prohibited; a consumption limiting unit operable to limit the use of the power source when the voltage falls below the consumption-limit level; and a limit prohibiting unit operable to prohibit the consumption limiting unit from limiting the use of the power source when the voltage of the power source falls below the consumption-limit level because of a momentary voltage fall different from a voltage fall corresponding to a discharge curve of the power source, wherein the voltage monitoring unit includes a comparator operable to compare the voltage of the power source to the consumption-limit level, the limit prohibiting unit includes a disabling unit operable to disable the comparator when the momentary voltage fall is expected to occur, the disabling unit lowering the consumption-limit level to such a level that the comparator detects no fall below the consumption-limit level.

According to the fifth aspect of the present invention, an image capturing apparatus includes; at least one component operable to perform one of a plurality of operations necessary for capturing an image; a power-source system for supplying power to the at least one component; and a controller operable to control the at least one component and the power-source system, wherein the power-source system includes: a power source for supplying the power; a voltage monitoring unit operable to monitor a voltage of the power source to detect that the voltage of the power source falls below a predetermined level; a consumption limiting unit operable to stop the supply of the power from the power source when the voltage of the power source falls below the predetermined level; and a limit prohibiting unit operable to prohibit stopping the supply of the power by the consumption limiting unit for a predetermined time period in accordance with a request from the controller, the controller sends the request to the limit prohibiting unit when an operation by the at least one component is an operation expected to cause a momentary voltage fall.

The length of the predetermined time period maybe determined in accordance with a type of the operation expected to cause the momentary voltage fall.

The image capturing apparatus may further include a memory operable to store the operation expected to cause the momentary voltage fall, wherein the controller determines whether or not the operation by the at least one component is the operation stored in the memory.

The memory may store an operation for driving the at least one component by using a motor as the operation expected to cause the momentary voltage fall.

The controller may send the limit prohibiting unit the request prior to the operation stored in the memory.

The limit prohibiting unit may prohibit stopping the supply of the power by making a result of the detection by the voltage monitoring unit ineffective. Alternatively, the limit prohibiting unit may prohibit stopping the supply of the power by lowering the predetermined level to such a level that no momentary voltage fall below the predetermined level expected to be caused by an operation by the at least one component is detected.

This summary of the invention does not necessarily describe all necessary features of the present invention. The present invention may also be a sub-combination of the above described features. The above and other features and advantages of the present invention will become more apparent from the following description of embodiments taken in conjunction with the accompanying drawings.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.
(Embodiment 1)

Figure 2:
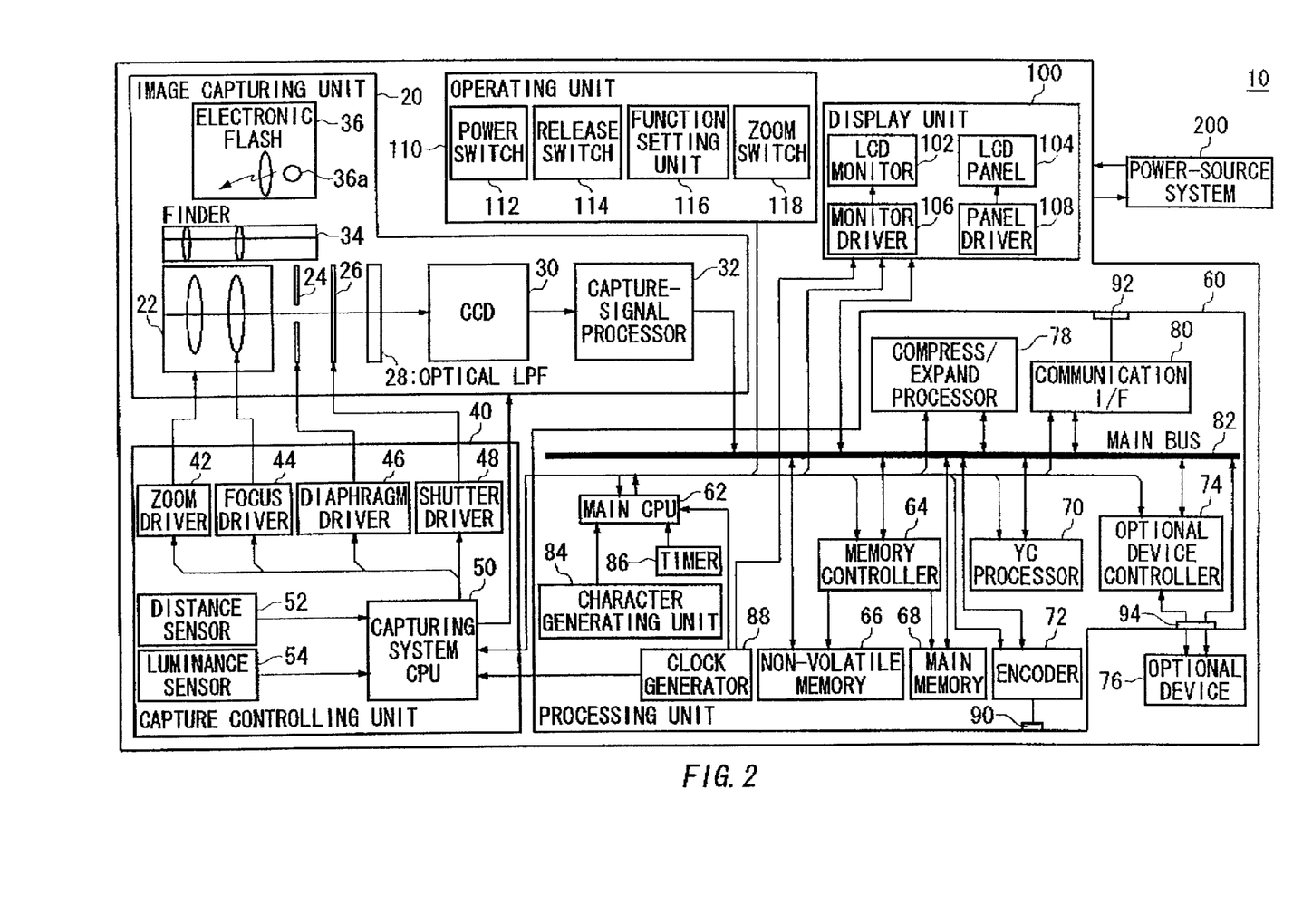
FIG. 2 shows a structure of a digital camera 10 according to the first embodiment of the present invention.

FIG. 2 shows an entire structure of a digital camera 10 that includes a power-source system 200 according to the first embodiment of the present invention. The power-source system 200 will be described in detail later. The digital camera 10 mainly includes an image capturing unit 20, a capture controlling unit 40, a processing unit 60, a display unit 100, an operating unit 110 and the power-source system 200.

The image capturing unit 20 includes mechanical members and electric members related to an image capturing and an image formation. The image capturing unit 20 includes a lens section 22, a diaphragm 24, a shutter 26, an optical LPF (low-pass filter) 28, a CCD 30 and a capture-signal processor 32. The lens section 22 includes a focus lens, a zoom lens and the like. This structure allows an image of a subject to be formed on a light receiving surface of the CCD 30. In accordance with the light amount of the formed image of the subject, respective sensor elements (not shown) of the CCD 30 are electrically charged. (Hereinafter, the electric charges stored in the sensor element are referred to as stored electric charges.) The stored electric charges are read by a read-gate pulse into a shift register (not shown), and are then read out as a voltage signal by a register transfer pulse successively.

The digital camera 10 generally has an electronic shutter function. Therefore, it is not essential for the digital camera 10 to include a mechanical shutter such as the shutter 26. In order to realize the electronic shutter function, the COD 30 is provided with a shutter drain via a shutter gate. When the shutter gate is driven, the stored electric charges are drained out into the shutter drain. By controlling the shutter gate, a time period in which the respective sensor elements are electrically charged, that is, a shutter speed can be controlled.

The voltage signal output from the CCD 30, that is an analog signal, is subjected to color separation for separating the signal into R, G and B components in the capture-signal processor 32, thereby white balance is adjusted. Next, the capture-signal processor 32 performs gamma correction. Then, the R, G and B signals are successively subjected to A/D conversion at necessary times. Digital image data obtained by the above operations (hereinafter, simply referred to as "digital image data") is output to the processing unit 60.

The image capturing unit 20 further includes a finder 34 and an electronic flash 36. The finder 34 may includes an LCD (not shown) therein. In this case, various types of information from a main CPU 62 described later and the like can be displayed within the finder 34. The electronic flash 36 works by emission of light by a discharge tube 36a when an energy stored in a condenser (not shown) is supplied to the discharge tube 36a.

The capture controlling unit 40 includes a zoom driver 42, a focus driver 44, a diaphragm driver 46, a shutter driver 48, a capturing system CPU 50 for controlling these drivers, a distance sensor 52 and a luminance sensor 54. Each of the drivers 42, 44, 46 and 48 includes a driving unit such as a stepping motor. When a release switch 114 described later is pressed down, the distance sensor 52 measures a distance to the subject while the luminance sensor 54 measures a luminance of the subject. The measured data of the distance (hereinafter, simply referred to as "distance data") and the measured data of the luminance (hereinafter, simply referred to as "luminance data") are sent to the capturing system CPU 50. The capturing system CPU 50 performs adjustments of a magnifying power and a focus of the lens section 22 by controlling the zoom driver 42 and the focus driver 44 based on capturing information such as magnification specified by the user.

The capturing system CPU 50 determines the F-number and the shutter speed based on an added value of the R, G and B digital signals of one image frame, that is, AE information. In accordance with the determined F number and the shutter speed, the diaphragm driver 46 adjusts the size of an aperture and the shutter driver 48 performs opening/closing the shutter 26.

Moreover, the capturing system CPU 50 controls the light emission by the electronic flash 36 based on the luminance data and also adjusts the aperture size of the diaphragm 24. When the user instructs the digital camera 10 to capture an image, the CCD 30 starts to be electrically charged. After the shutter period calculated from the luminance data has passed, the stored electric charges are output to the capture-signal processor 32.

The processing unit 60 includes the main CPU 62 for controlling the whole digital camera 10, especially the processing unit 60; a memory controller 64; a YC processor 70; an optional device controller 74; a compress/expand processor 78; and a communication interface (I/F) 80 that are controlled by the main CPU 62. The main CPU 62 communicates with the capturing system CPU 50 by serial communication or the like. An operation clock of the main CPU 62 is supplied from a clock generator 88 that also supplies clocks having different frequencies to the capturing system CPU 50 and the display unit 100, respectively.

In addition to the main CPU 62, a character generator 84 and a timer 86 are provided in the processing unit 60. The timer 86 has the backing of a battery cell so that the timer 86 always counts the time and date. Based on the counted values, information regarding the capturing date and other information related to the time are sent to the main CPU 62. The character generator 84 generates character information such as the capturing date, a title of the captured image or the like. The thus generated character information is appropriately combined with the captured image.

The memory controller 64 controls a non-volatile memory 66 and a main memory 68. The non-volatile memory 66 includes an EEPROM (electrically erasable and programmable ROM) and/or a flash memory or the like, and stores various data to be held even when the power of the digital camera 10 turns off, such as information set by the user and parameters set when the digital camera 10 was shipped. The non-volatile memory 66 may store a boot program for the main CPU 62 or a system program, if necessary. On the other hand, the main memory 68 is composed of a relatively inexpensive memory having a larger capacity, such as a DRAM, in general. The main memory 68 has a function of a frame memory for storing data output from the image capturing unit 20, a function of a system memory for loading necessary programs, and a function of a working area. The non-volatile memory 66 and the main memory 68 communicate with the parts in the processing unit 60 and other parts outside the processing unit 60 via a main bus 82.

The YC processor 70 subjects the digital image data to YC conversion so as to generate a luminance signal Y and color-difference signals B-Y and R-Y. The luminance signal and the color difference signals are temporarily stored in the main memory 68 by the memory controller 64. The compress/expand controller 78 successively reads the luminance signal and the color-difference signals from the main memory 68 and compresses the read signals. The resultant data (hereinafter, simply referred to as "compressed data") is written into a memory card, that is a kind of an optional device 76, via the optional device controller 74.

The processing unit 60 further includes an encoder 72. The encoder 72 inputs the luminance signal and the color-difference signals, converts these input signals into a video signal (NTSC or PAL signal) and then outputs the video signal from a video output terminal 90. In a case where the video signal is generated from the data stored in the optional device 76, the data is first supplied to the compress/expand processor 78 via the optional device controller 74, and is then subjected to a necessary expansion operation in the compress/expand processor 78. Finally, the expanded data is converted into the video signal by the encoder 72.

The optional device controller 74 performs generation of a signal or signals required by the main bus 82 and the optional device 76, logical transform, or voltage conversion in accordance with the specification of signals accepted by the optional device 76 and the bus-specification of the main bus 82. The digital camera 10 may support a device other than the aforementioned memory card, for example, a standard I/O card conforming to PCMCIA. In this case, the optional device controller 74 may be composed of an LSI for controlling a bus for PCMCIA.

The communication I/F 80 controls protocol conversion or the like in accordance with the communication specification supported by the digital camera 10, such as USB, RS-232C or Ethernet. The communication I/F 80 includes a driver IC, if necessary, and communicates with external equipments including a network via a connector 92. In addition, the digital camera 10 maybe configured to allow data communication with external devices such as a printer, a karaoke (sing-along machine), or a game player via a special I/F, other than the above-mentioned standard specification.

The display unit 100 includes an LCD monitor 102 and an LCD panel 104 that are controlled by a monitor driver 106 and a panel driver 108, respectively. The LCD monitor 102, that has a size of about 2 inches, for example, is provided on the back face of the digital camera 10, and displays a current operation mode such as a capturing mode or a playback mode, magnification of the image capturing or the playback image, the residual amount of the battery cell, the date, a screen for setting modes, an image of the subject, or the like. On the other hand, the LCD panel 104 is a small monochrome LCD, for example, and is provided on the upper face of the digital camera 10. The LCD panel 104 simply displays information such as the image quality, for example, FINE, NORMAL, BASIC, ON/OF of the electronic flash, the number of images normally capturable, the number of pixels, and the battery capacity or the like.

The operating unit 110 includes mechanisms and electric members required for the user to set or instruct the operation and the operation mode of the digital camera 10 to the digital camera 10. A power switch 112 determines whether or not the power of the digital camera 10 turns on/off. The release switch 114 has a two-step structure allowing half-pressing and complete-pressing of it. For example, when the release switch 114 is half-pressed, AF and AE are locked. Then, the release switch 114 is completely pressed, a shot image is taken into the digital camera 10 and is recorded in the main memory 68 and/or the recording medium 76 after necessary signal processing and data compression and the like are performed. The operating unit 110 may receive settings set by a switch other than the above-mentioned switches, such as a rotary mode dial or a cross key. These switches as a whole are called as a function setting part 116 in FIG. 1. The operations or functions that can be set by the operating unit 110 include "file format", "special effect", "print", "determine/store", and "change display", for example. A zoom switch 118 determines the magnifying power.

The power-source system 200 supplies the electric power required for operations of the respective components of the digital camera 10 to the digital camera 10. The power-source system 200 that is a characteristic part of the present invention is described in detail.

Figure 3:
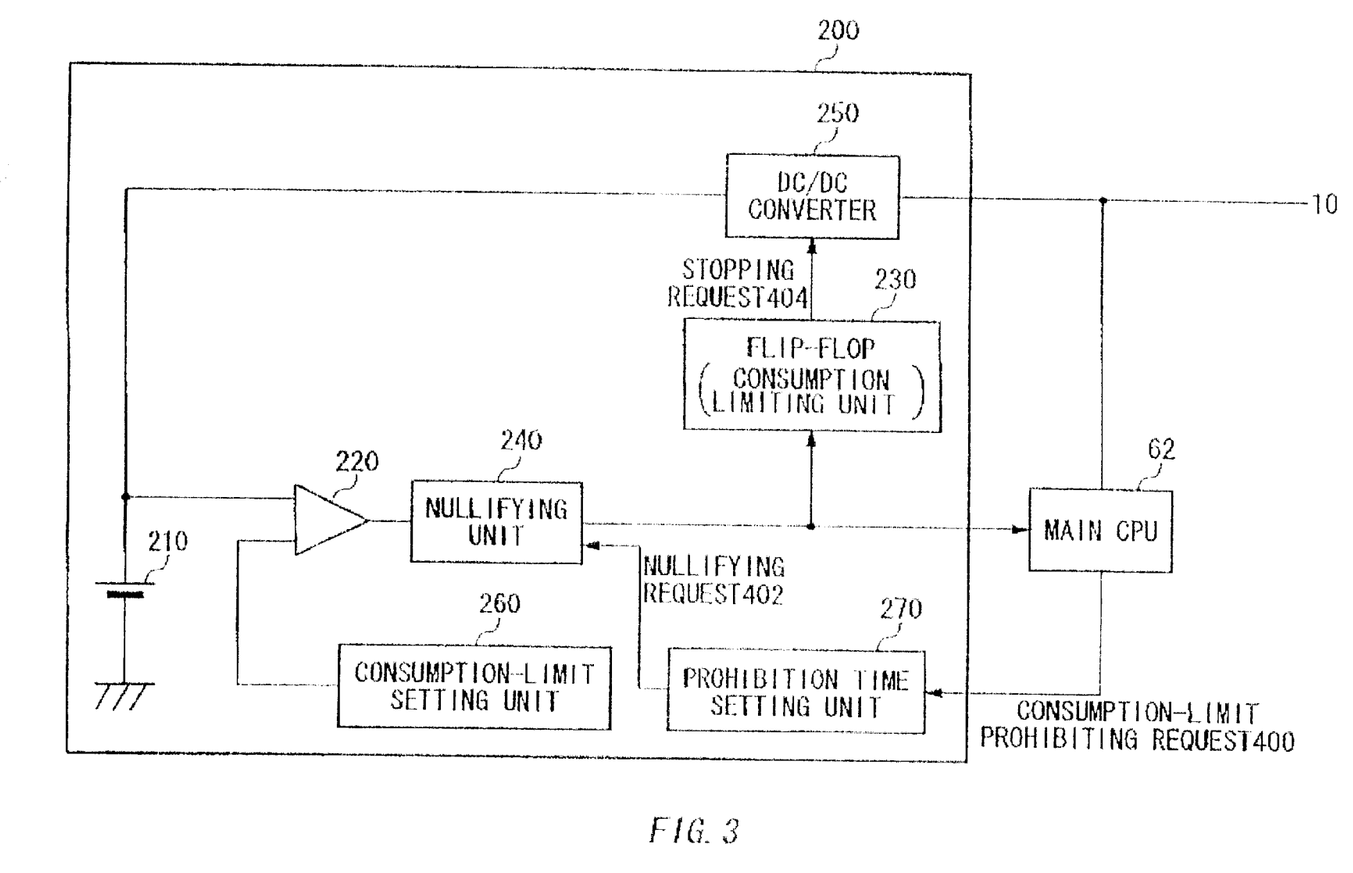
FIG. 3 schematically shows a structure of a power-source system 200 according to the first embodiment of the present invention.

FIG. 3 shows a structure of the power-source system 200. The power-source system 200 includes a battery 210, a comparator 220 as an example of a voltage monitoring unit, a flip-flop 230 as an example of a consumption limiting unit, a nullifying unit 240, a DC/DC converter 250, a consumption-limit setting unit 260, and a prohibition-time setting unit 270.

The battery 210 supplies an electric energy to the respective components of the digital camera 10. The DC/DC converter 250 increases or reduces a voltage supplied from the battery 220 to a predetermined voltage so as to supply it to the respective components to the digital camera 10. The consumption-limit setting unit 260 sets a consumption-limit level below which the use of the battery 210 is determined to be stopped, and inputs the set consumption-limit level to the comparator 220 as a reference voltage. The consumption-limit level is determined to such a level that the decision that the battery 210 has been consumed and therefore cannot supply a sufficient voltage is to be made. The comparator 220 compares the voltage of the battery 220 with the consumption-limit level set by the consumption-limit level setting unit 260, and outputs a LOW signal when the voltage of the battery 210 is not below the consumption-limit level or a HIGH signal when the voltage of the battery 210 is below the consumption-limit level. In the following description, the LOW signal and the HIGH signal are referred to as a normal value and an abnormal value, respectively.

When the abnormal value is sent to the flip-flop 230, the flip-flop 230 latches the abnormal value and sends a stopping request 404 to the DC/DC converter 250. Upon receipt of the stopping request 404, the DC/DC Converter 250 stops operating. Thus, the use of the electric energy of the battery 210 by the respective components of the digital camera 10 is limited. As described above, the flip-flop 230 serves as the consumption limiting unit. Moreover, the main CPU 62 stops operating when receiving the abnormal value in the present embodiment. Alternatively, the main CPU 62 may stop operating after performing necessary post-operations.

The prohibition-time setting unit 270 determines a length of a time period in which the consumption is limited when receiving a consumption-limit prohibiting request 400 from the main CPU 62, and issues a nullifying request 402 to the nullifying unit 240 for the time period having the determined length. The nullifying unit 240 sends the output of the comparator 220 to the flip-flop 230 and the main CPU 62 while it receives no nullifying request from the prohibition-time setting unit 270.

When the nullifying request 402 is sent from the prohibition-time setting unit 270, the nullifying unit 240 makes the output of the comparator 220 ineffective. In other words, the nullifying unit 240 ignores the output of the comparator 220 and sends the normal value to the flip-flop 230 and the main CPU 62 whether the comparator 220 outputs the normal value or the abnormal value. Thus, even if the comparator 220 outputs the abnormal value, the abnormal value is made ineffective by the nullifying unit 240 and therefore does not reach the flip-flop 230. Accordingly, limiting the use of the battery can be prohibited. In this operation, the main CPU 62 operates as a limit-prohibition requesting unit.

In a case where the digital camera 10 performs an operation that causes a heavy-load state where a larger current is required than that in a normal-load state, the main CPU 62 serving as the limit-prohibition requesting unit sends the consumption-limit prohibiting request 400 to the prohibition-time setting unit 270 prior to the operation by the digital camera 10. That is, the main CPU 62 prohibits the use of the battery 210 from being limited prior to the operation when the operation is expected to cause a momentary voltage fall. Therefore, the supply of the power can be prevented from being stopped.

In the digital camera 10 having the structure shown in FIG. 2, when the zoom driver 42 drives a zoom motor in order to move a zoom lens, for example, a large current flows through the motor momentarily. At this time, the voltage of the battery 210 may fall below the consumption-limit level rapidly. However, such a voltage fall is a momentary phenomenon and is different from the voltage fall in accordance with the discharge curve of the battery 210. Therefore, such a sudden voltage fall should not be interpreted as indicating that the battery 210 has been consumed to such a level that the battery 210 cannot be used any longer.

In order to prevent the stop of the power supply caused by the momentary voltage fall, the main CPU 62 sends the consumption-limit prohibiting request 400 to the prohibition-time setting unit 270 prior to the driving of the zoom lens by the zoom driver 42. The prohibition-time setting unit 270 determines a length of a time period in which the large current is required for driving the zoom lens, and sets the determined time as a prohibition time during which limiting of the use of the battery 210 is to be prohibited. The prohibition-time setting unit 270 then sends the nullifying request 402 to the nullifying unit 240 for the prohibition time set described above, thereby preventing the abnormal value from being sent to the flip-flop 230. In this manner, it is possible to prevent the stop of the power supply because of the momentary voltage fall.

In the digital camera 10, operations that cause the heavy-load state, in which the larger current is required than that in the normal-load state include, for example, an operation for driving a focusing motor by the focus driver 44, an operation for driving the shutter 26 by the shutter driver 48 and a charging operation for the electronic flash 36. In addition, when circuits that have been in an off state are turned on, the heavy-load state occurs momentarily because of charging capacitors or the like. Also in such a case, the power-source system 200 of the present embodiment can prevent the stop of the power supply caused by the momentary voltage fall. Such operations expected to cause the heavy-load state may be stored in a memory of the digital camera 10.

Moreover, a case where the battery voltage falls suddenly because of phenomena different from the operations that are expected to cause the heavy-load state is also considered. As such a special case, for example, a case where the battery 210 falls out, a case of short-circuit occurring in any circuit of the digital camera 10 and the like are considered. These cases are situations suddenly requiring prompt stop of the system operation. Therefore, the nullifying unit 240 may send the output of the comparator 220 to the flip-flop 230 and the main CPU 62 without making it ineffective when limiting of the consumption is not prohibited. Thus, the supply of the power can be appropriately stopped when the voltage suddenly falls because of the unexpected phenomenon.

For the operation that is expected to cause the heavy-load state, the length of a time period during which the heavy-load state continues to remain is substantially determined depending on a type of the operation. Thus, the prohibition-time setting unit 270 may set the prohibition time during which limiting the use of the battery is prohibited in accordance with the type of the operation causing the heavy-load state. In this case, the length of the prohibition time can be reduced to the minimum and therefore a time period in which a sudden voltage fall because of the unexpected phenomenon cannot be detected can be reduced to the minimum.

Figure 4:
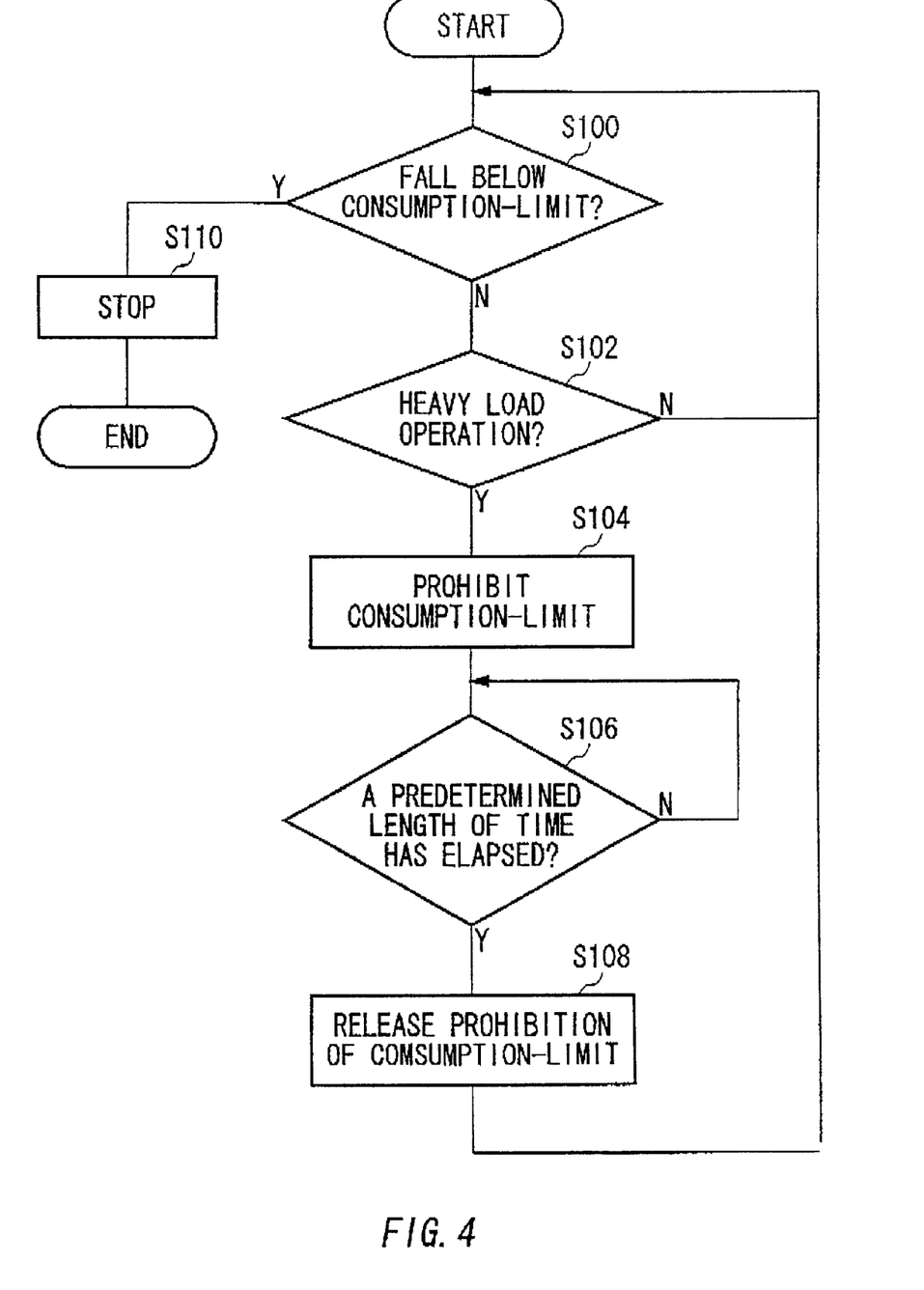
FIG. 4 is a flowchart showing a power supplying method according to the first embodiment of the present invention

FIG. 4 is a flowchart showing a power supplying method according to the present embodiment. First, when the digital camera 10 turns on, the comparator 220 checks whether or not the voltage of the battery 210 is below the consumption-limit level (Step S100). When the voltage of the battery 210 is determined to be below the consumption-limit level, the power supply to the digital camera 10 is stopped (Step S110). Otherwise, in a case where the voltage of the battery 210 is not be below the consumption-limit level, it is then determined whether or not the digital camera 10 is to perform the operation causing the heavy-load state where the large current is required momentarily (Step S102). In a case where the digital camera 10 does not perform such an operation, the flow goes back to Step S100 and the power-source system 200 continues to monitor the battery voltage.

When it is determined that the digital camera 10 is to perform the operation causing the heavy-load state, the consumption-limit prohibiting request is sent from the main CPU 62 to the prohibition time setting unit 270 that then sends the nullifying request to the nullifying unit 240 for the prohibition time set by the prohibition-time setting unit 270. Consequently, the nullifying unit 240 that received the nullifying request makes the output from the comparator 220 ineffective, so that limiting the use of the battery 210 is prohibited (Step S104). Then, the system waits until the prohibition time set by the prohibition-time setting unit 270 has passed (step S106). When the prohibition time has elapsed, the prohibition-time setting unit 270 stops sending the nullifying request 402, thereby releasing the prohibition of limiting the use of the battery 210 (Step S108). Then, the flow goes back to Step S100 and the power-source system continues to monitor the battery voltage.

In accordance with the above-mentioned method, it is possible to prevent the system from being stopped because of the expected momentary voltage fall and therefore the electric energy of the battery 210 can be used efficiently.

In the method shown in FIG. 4, limiting the use of the battery is prohibited prior to the operation expected to cause the heavy-load state. Also, even in a case of the unexpected sudden voltage fall, limiting the use of the battery may be prohibited when the voltage of the battery 210 exceeds the consumption-limit level after a predetermined time period has elapsed. In this case, the nullifying unit 240 waits for the predetermined time period when receiving the abnormal value from the comparator 220. When the output of the comparator 220 returns to the normal value after the predetermined time period has elapsed, the nullifying unit 240 does not send the abnormal value but send the normal value to the flip-flop 230 and the main CPU 62. On the other hand, when the comparator 220 still outputs the abnormal value after the predetermined time period has passed, the nullifying unit 240 sends the abnormal value to the flip-flop 230 and the main CPU 62. Alternatively, the nullifying unit 240 may monitor the temporal change of the voltage of the battery 210 and determine with reference to the voltage curve of the battery 210 whether or not limiting the use of the battery is to be prohibited.

Figure 5A:
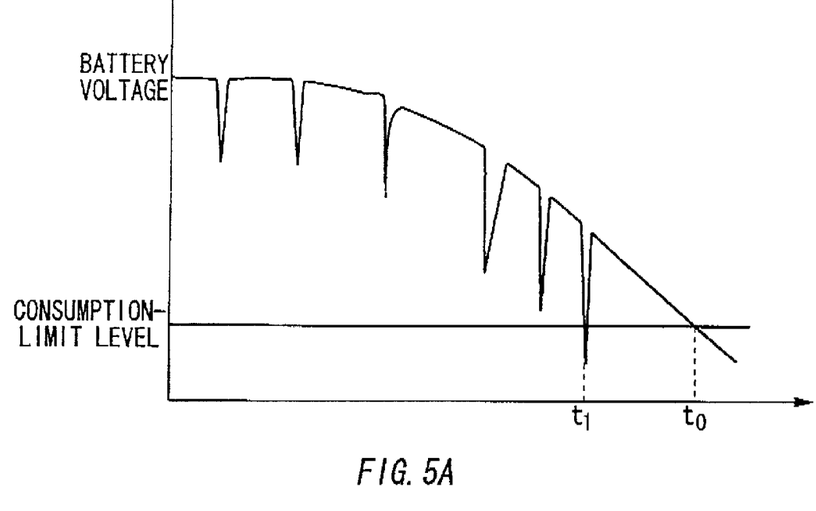
FIGS. 5A to 5E show a temporal change of a voltage of a battery 210 and states of respective signals in the power-source system 200 according to the first embodiment of the present invention.
Figure 5B:
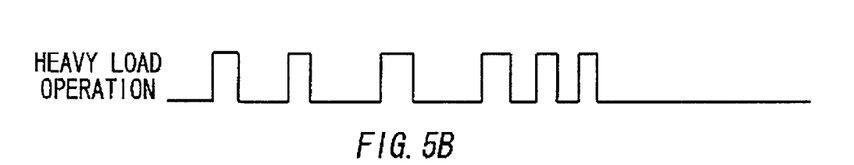
Figure 5C:
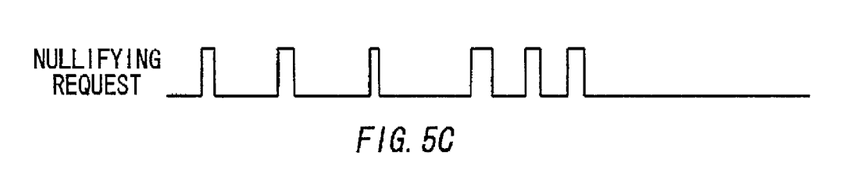

FIGS. 5A, 5B, 5C, 5D and 5E show the temporal change of the voltage of the battery 210 and states of the respective signals in the power-source system 200 according to the present embodiment. FIG. 5A shows the temporal change of the battery voltage. FIG. 5B is a chart showing the occurrence of the operation expected to cause the heavy-load state. As such an operation, driving the motor, charging the electronic flash, switching the circuits in the off-state to the on-state, and the like can be considered. At H level in FIG. 5B, the operation expected to cause the heavy-load state is activated. FIG. 5C shows the state of the nullifying request 402 output from the prohibition-time setting unit 270. The nullifying request 402 turns on (i.e., becomes H level) prior to each operation shown in FIG. 5B, continues to be in the on-state for a time period having a length determined in accordance with the type of the operation, and returns back to the off-state.

Figure 5D:
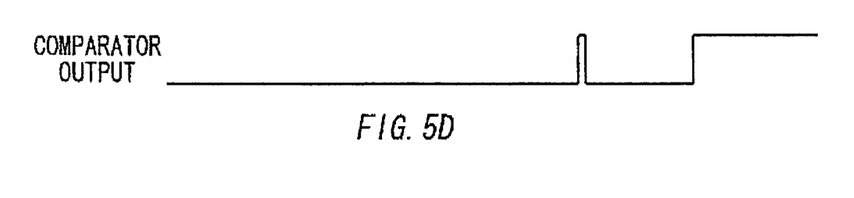

FIG. 5D shows the output of the comparator 220. Until the time t1, the voltage of the battery 210 does not fall below the consumption-limit level, as shown in FIG. 5A. Therefore, the output of the comparator 220 has the normal value (L level). At the time t1, the voltage of the battery 210 falls below the consumption-limit level because of the momentary voltage fall, as shown in FIG. 5A, and therefore the output of the comparator 220 has the abnormal value (H level), as shown in FIG. 5D. After the time t0, since the voltage of the battery 210 does not exceed the consumption-limit level, the comparator 220 outputs the abnormal value.

Figure 5E:
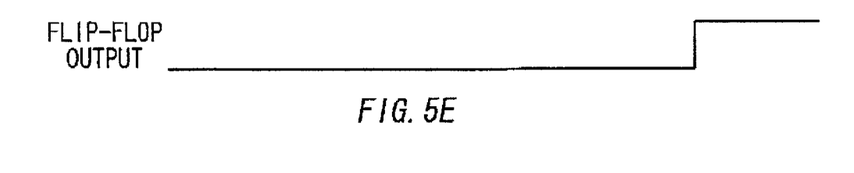

FIG. 5E shows the output of the flip-flop 230. At the time t1, the comparator 220 outputs the abnormal value as shown in FIG. 5D. However, since the nullifying unit 240 receives the nullifying request 402 as shown in FIG. 5C, the abnormal value from the comparator 220 is ignored, the flip-flop 230 outputs the normal value (L level). At the time t0, the comparator 220 outputs the abnormal value while the nullifying request is not sent to the nullifying unit 240, the flip-flop 230 latches the abnormal value so as to output the abnormal value.

The functions of the consumption limiting unit 230, the nullifying unit 240, the consumption-limit setting unit 260 and the prohibition-time setting unit 270 may be implemented by hardware composed of circuits or software. For example, the functions of those components can be implemented by cooperation of the main CPU 62 (shown in FIG. 2) and at least one program stored in or loaded from the main memory 68 or the non-volatile memory 66. In a case where the main CPU 62 includes an internal memory, necessary program may be stored in the internal memory to implement the functions of the above components by firmware. Although the respective functions of the power-source system 200 are described as being unified as one component in FIG. 3, these functions are not always unified. Also, it is not necessary to unify these functions as one component. In the digital camera 10, the design for realizing the respective functions of the power-source system 200 has considerable freedom.

(Embodiment 2)

Figure 6:
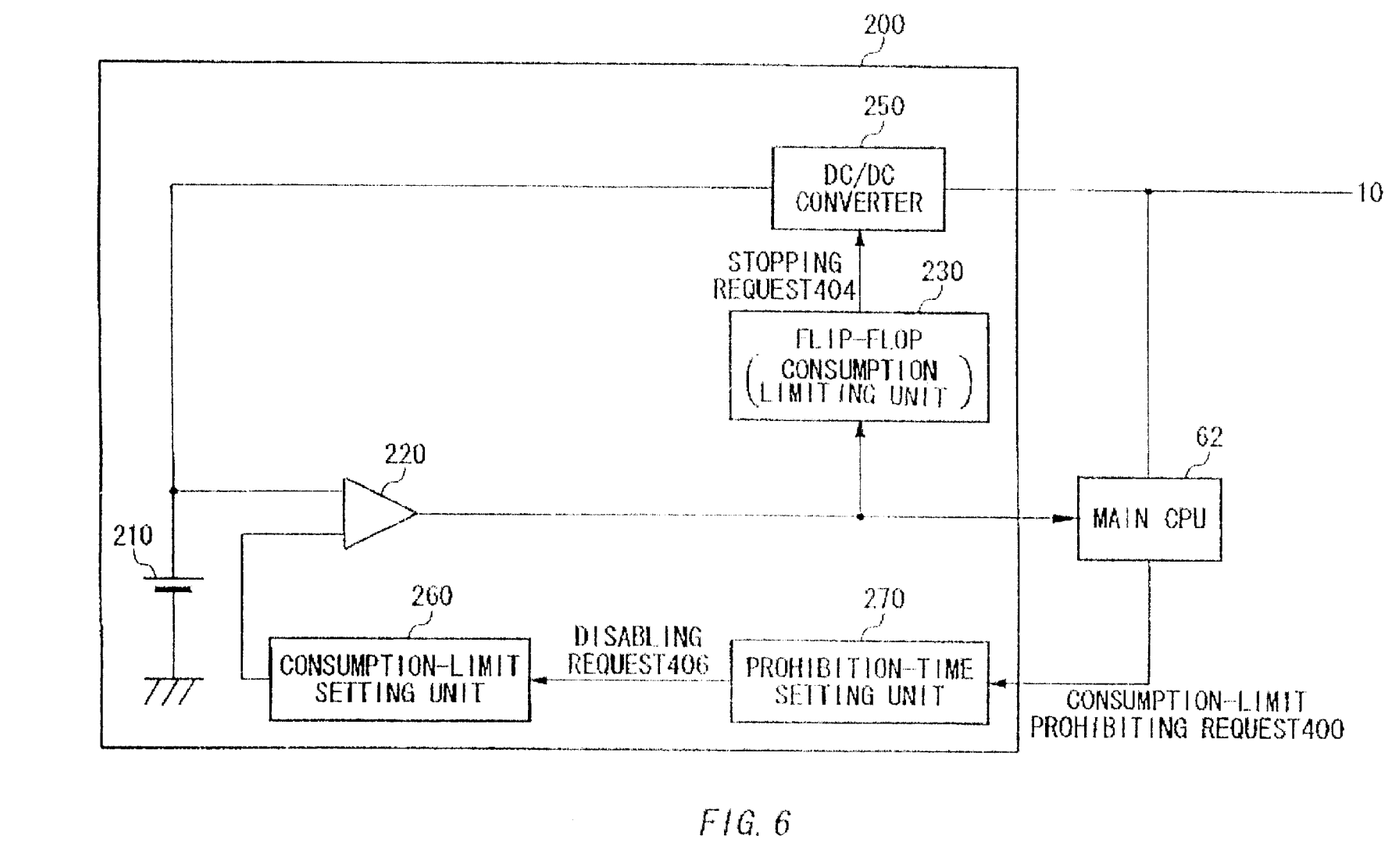
FIG. 6 schematically shows a structure of a power-source system 200 according to the second embodiment of the present invention.

FIG. 6 shows the structure of the power-source system 200 according to the second embodiment of the present invention. When the power-source system 200 of the present embodiment is compared to that of the first embodiment shown in FIG. 3, the nullifying unit 240 is not included. Instead of the nullifying unit 240, the power-source system 200 includes a supply-limit setting unit 260 serving as the consumption-limit prohibiting unit. The structure of other parts and the operations of the power-source system 200 are the same as those in the first embodiment.

When receiving the consumption-limit prohibiting request 400, the prohibition-time setting unit 270 sets the prohibition time during which limiting the use of the battery is to be prohibited in accordance with the type of the operation of the digital camera 10. The prohibition-time setting unit 270 sends a disabling request 406 to the consumption-limit setting unit 260 for the prohibition time set as described above. The consumption-limit setting unit 260 lowers the consumption-limit level to a predetermined level while the prohibition-time setting unit 270 issues the disabling request 406. Thus, since the consumption-limit level to which the comparator 220 refers is lowered briefly, the comparator 220 cannot detect the voltage fall below the consumption-limit level. Therefore, the consumption-limit setting unit 260 serves as a disabling unit.

The consumption-limit prohibiting request 400 may be sent to the prohibition-time setting unit 270 when the digital camera 10 performs the operation that is expected to cause the heavy-load state. The magnitude of the voltage fall with the occurrence of the heavy-load state is determined depending on the type of the operation inmost cases. Thus, the consumption-limit setting unit 260 may set the consumption-limit level while the disabling request is being issued to a level to which the voltage is expected to fall because of the heavy-load state in accordance with the type of the operation. In this case, since the voltage of the battery 210 falls below the thus expected level when the voltage fall is caused by unexpected phenomena, such as falling of the battery out of the digital camera 10 or the occurrence of the short-circuit, the comparator 220 can detect such an abnormal voltage fall caused by the unexpected phenomena. Therefore, even during the prohibition time in which the disabling request continues to be issued, the power supply can be stopped appropriately when the voltage fall caused by the unexpected phenomena occurs.

Figure 7A:
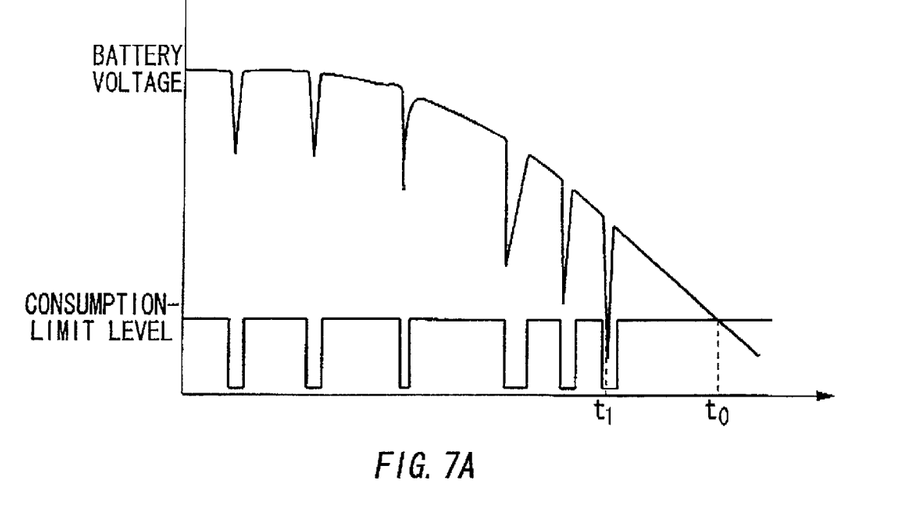
FIGS. 7A to 7E show a temporal change of a voltage of a battery 210 and states of respective signals in the power-source system 200 according to the second embodiment of the present invention.
Figure 7B:
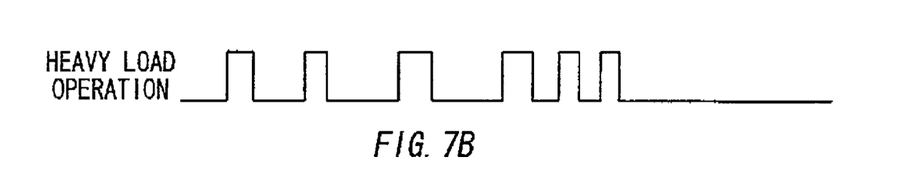
Figure 7C:
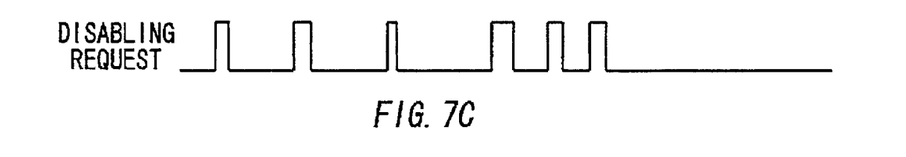

FIGS. 7A, 7B, 7C, 7D and 7E show the temporal change of the voltage of the battery 210 and states of the respective signals in the power-source system 200 according to the present embodiment. FIG. 7A shows the temporal change of the battery voltage and the change of the consumption-limit level. FIG. 7B shows the occurrence of the operation expected to cause the heavy-load state. As such an operation, driving the motor, charging the electronic flash, switching the circuits in the off-state to the on-state, and the like can be considered. In FIG. 7B, the operation expected to cause the heavy-load state is activated at H level. FIG. 7C shows the state of the disabling request 406 output from the prohibition-time setting unit 270. The disabling request 406 turns on (i.e., becomes H level) prior to each operation shown in FIG. 7B, continues to be in the on-state for a time period having a length determined in accordance with the type of the operation, and returns back to the off-state.

Figure 7D:
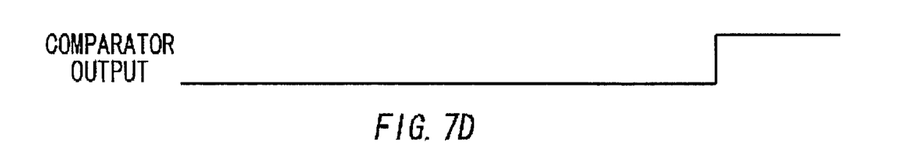
Figure 7E:
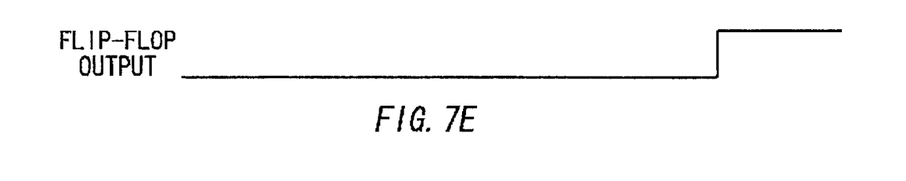

FIG. 7D shows the output of the comparator 220. Until the time t1, the voltage of the battery 210 does not fall below the consumption-limit level, as shown in FIG. 7A. Therefore, the output of the comparator 220 has the normal value (L level). At the time t1, the voltage of the battery 210 momentarily falls. However, the comparator 220 does not detect this voltage falls because the consumption-limit setting unit 260 lowers the consumption-limit level in advance, as shown in FIG. 7A. After the time t0, since the voltage of the battery 210 does not exceed the consumption-limit level, the comparator 220 outputs the abnormal value. FIG. 7E shows the output of the flip-flop 230. The flip-flop 230 latches the abnormal value so as to output it to the DC/DC converter 250.

According to the power-source system 200 of the present embodiment, the power supply can be prevented from being stopped by the expected momentary voltage fall. Thus, the electric energy of the battery 210 can be used efficiently.

Although the voltage of the battery 210 is monitored by using the comparator 220 in the above embodiments, the output voltage of the DC/DC converter 250 may be monitored.

As is apparent from the above description, according to the present invention, a power-source system that can use electric energy of a power source, a power supplying method that can be used in the power-source system and an image capturing apparatus that can use the power-source system can be provided.

Although the present invention has been described by way of exemplary embodiments, it should be understood that many changes and substitutions may be made by those skilled in the art without departing from the spirit and the scope of the present invention which is defined only by the appended claims.

What is claimed is:

1. A power-source system comprising:
   a power source;
   a voltage monitoring unit operable to monitor a voltage of said power source to detect that said voltage falls below a consumption-limit level below which the use of said power source is to be limited;
   a consumption limiting unit operable to limit the use of said power source when said voltage falls below said consumption-limit level; and
   a limit prohibiting unit operable to prohibit said consumption limiting unit from limiting the use of said power source when said voltage of said power source falls below said consumption-limit level prior to a momentary voltage fall different from a voltage fall corresponding to a discharge curve of said power source.

2. A power-source system as claimed in claim 1, wherein said limit prohibiting unit includes a nullifying unit operable to prevent a result of the detection by said voltage monitoring unit from being sent to said consumption limiting unit prior to said momentary voltage fall.

3. A power-source system as claimed in claim 1, wherein said limit prohibiting unit includes a disabling unit operable to disable said voltage monitoring unit prior to said momentary voltage fall.

4. A power-source system as claimed in claim 1, wherein said limit prohibiting unit includes a nullifying unit operable to prevent a result of the detection by said voltage monitoring unit from being sent to said consumption limiting unit when said momentary voltage fall is detected.

5. A power supplying method for supplying power to a load from a power source, comprising;
limiting supply of said power when a voltage of said power source falls below a predetermined level; and
prohibiting said supply of said power from being limited in a case where said load requires a larger current than a current required normally, said voltage of said power source momentarily falling below said predetermined level.

6. An image capturing apparatus for capturing an image, comprising at least one component performing a predetermined operation and a power-source system for supplying a power to said at least one component, wherein said power-source system includes:
a power source;
a voltage monitoring unit operable to output an abnormal signal when said voltage falls below a consumption-limit level below which the use of said power source is to be limited;
a consumption limiting unit operable to limit the use of said power source when receiving said abnormal signal from said voltage monitoring unit; and
a limit prohibiting unit operable to prohibit said abnormal signal from being received by said consumption limiting unit in a case where said voltage of said power source falls below said consumption-limit level prior to a momentary voltage fall caused by an occurrence of a heavy-load state requiring a larger current than a current required in a normal-load state.

7. An image capturing apparatus as claimed in claim 6, wherein said heavy-load state causing said momentary voltage fall is a state caused by an operation for driving said at least one component by using a motor.

8. An image capturing apparatus as claimed in claim 6, further comprising a limit-prohibition requesting unit operable to send said limit prohibiting unit a request of prohibiting said abnormal signal prior to said occurrence of said heavy-load state.

9. An image capturing apparatus as claimed in claim 8, wherein said limit prohibiting unit allows said abnormal signal to be sent to said consumption limiting unit in the absence of said request of prohibiting said abnormal signal.

10. An image capturing apparatus as claimed in claim 8, further comprising a prohibition-time setting unit operable to set a prohibition time in accordance with a type of said heavy-load state, said prohibition time being a time period during which limiting the use of said battery is to be prohibited.

11. A power-source system comprising:
a power source;
a voltage monitoring unit operable to detect that a voltage of said power source falls below a consumption-limit level below which the use of said power source is to be prohibited;
a consumption limiting unit operable to limit the use of said power source when said voltage falls below said consumption-limit level; and
a limit prohibiting unit operable to prohibit said consumption limiting unit from limiting the use of said power source when said voltage of said power source falls below said consumption-limit level because of a momentary voltage fall different from a voltage fall corresponding to a discharge curve of said power source, wherein
said voltage monitoring unit includes a comparator operable to compare said voltage of said power source to said consumption-limit level,
said limit prohibiting unit includes a disabling unit operable to disable said comparator when said momentary voltage fall is expected to occur, said disabling unit lowering said consumption-limit level to such a level that said comparator detects no fall below said consumption-limit level.

12. An image capturing apparatus comprising:
at least one component operable to perform one of a plurality of operations necessary for capturing an image;
a power-source system for supplying power to said at least one component; and
a controller operable to control said at least one component and said power-source system, wherein said power-source system includes:
a power source for supplying said power;
a voltage monitoring unit operable to monitor a voltage of said power source to detect that said voltage of said power source falls below a predetermined level;
a consumption limiting unit operable to stop the supply of said power from said power source when said voltage of said power source falls below said predetermined level; and
a limit prohibiting unit operable to prohibit stopping the supply of said power by said consumption limiting unit for a predetermined time period in accordance with a request from said controller,
said controller sends said request to said limit prohibiting unit when an operation by said at least one component is an operation expected to cause a momentary voltage fall.

13. An image capturing apparatus as claimed in claim 12, wherein a length of said predetermined time period is determined in accordance with a type of said operation expected to cause said momentary voltage fall.

14. An image capturing apparatus as claimed in claim 12, further comprising a memory operable to store said operation expected to cause said momentary voltage fall, wherein said controller determines whether or not said operation by said at least one component is said operation stored in said memory.

15. An image capturing apparatus as claimed in claim 14, wherein said memory stores an operation for driving said at least one component by using a motor as said operation expected to cause said momentary voltage fall.

16. An image capturing apparatus as claimed in claim 15, wherein said controller sends said limit prohibiting unit said request prior to said operation stored in said memory.

17. An image capturing apparatus as claimed in claim 12, wherein said limit prohibiting unit prohibits stopping the supply of said power by making a result of the detection by said voltage monitoring unit ineffective.

18. An image capturing apparatus as claimed in claim 12, wherein said limit prohibiting unit prohibits stopping the supply of said power by lowering said predetermined level to such a level that no momentary voltage fall below said predetermined level expected to be caused by an operation by said at least one component is detected.

* * * * *